United States Patent
Van Ausdall et al.

(10) Patent No.: US 10,248,211 B1
(45) Date of Patent: Apr. 2, 2019

(54) GROUND-SHIFTED TOUCH INPUT SENSOR FOR CAPACITIVELY DRIVING AN ELECTROSTATIC PLATE

(71) Applicant: Apple Inc., Cupertino, CA (US)

(72) Inventors: Terrence L. Van Ausdall, Boulder Creek, CA (US); Senem E. Emgin, Mountain View, CA (US); Soyoung Kim, Redwood City, CA (US); Ryan J. Moynihan, San Francisco, CA (US); YiBo Liu, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/719,326

(22) Filed: Sep. 28, 2017

(51) Int. Cl.
*G06F 3/01* (2006.01)
*G06F 3/041* (2006.01)
*G06F 3/044* (2006.01)

(52) U.S. Cl.
CPC ............. *G06F 3/016* (2013.01); *G06F 3/044* (2013.01); *G06F 3/0416* (2013.01); *G06F 2203/04107* (2013.01)

(58) Field of Classification Search
CPC ........ G06F 3/016; G06F 3/0416; G06F 3/044; G06F 2203/04107
See application file for complete search history.

(56) References Cited

U.S. PATENT DOCUMENTS

| | | | | |
|---|---|---|---|---|
| 8,314,775 | B2 * | 11/2012 | Westerman | G06F 3/0235 345/173 |
| 9,122,330 | B2 | 9/2015 | Olivier et al. | |
| 9,579,690 | B2 | 2/2017 | Beecher et al. | |
| 9,612,674 | B2 | 4/2017 | Degner et al. | |
| 9,733,746 | B2 | 8/2017 | Colgate et al. | |
| 2010/0162109 | A1 * | 6/2010 | Chatterjee | G06F 3/016 715/702 |
| 2012/0287068 | A1 * | 11/2012 | Colgate | G06F 3/016 345/173 |
| 2014/0192005 | A1 | 7/2014 | Wakuda et al. | |
| 2014/0208204 | A1 | 7/2014 | Lacroix et al. | |
| 2014/0320431 | A1 | 10/2014 | Cruz-Hernandez et al. | |
| 2014/0375580 | A1 * | 12/2014 | Peshkin | G06F 3/016 345/173 |
| 2015/0169118 | A1 * | 6/2015 | Lee | G06F 3/047 345/174 |
| 2015/0309573 | A1 | 10/2015 | Brombach et al. | |
| 2016/0124548 | A1 * | 5/2016 | Cherif | G06F 3/044 345/174 |
| 2016/0313793 | A1 | 10/2016 | Hong et al. | |
| 2016/0357342 | A1 | 12/2016 | Olley et al. | |
| 2016/0370862 | A1 | 12/2016 | Colgate et al. | |
| 2017/0060239 | A1 * | 3/2017 | Lim | G06F 3/041 |
| 2017/0178470 | A1 * | 6/2017 | Khoshkava | G06F 3/016 |
| 2017/0192541 | A1 * | 7/2017 | Bulea | G06F 3/03547 |
| 2017/0364158 | A1 * | 12/2017 | Wen | H01L 41/0986 |
| 2017/0364184 | A1 * | 12/2017 | Weinerth | G06F 3/044 |
| 2018/0081441 | A1 * | 3/2018 | Pedder | G06F 3/016 |

* cited by examiner

*Primary Examiner* — Dmitriy Bolotin
(74) *Attorney, Agent, or Firm* — Brownstein Hyatt Farber Schreck, LLP (57) ABSTRACT

An input/output interface for an electronic device receives touch and/or force input and, additionally provides haptic output to a user. In particular the input/output interface is operated in conjunction with an input surface and includes at least one input sensor and at least one haptic output element. In typical embodiments, the input sensor is ground-shifted to prevent damage to the input sensor when the haptic output element is driven.

20 Claims, 10 Drawing Sheets

GROUND-SHIFTED TOUCH INPUT SENSOR FOR CAPACITIVELY DRIVING AN ELECTROSTATIC PLATE

FIELD

Embodiments described herein relate to electronic devices, and in particular, to electronic devices that incorporate a ground-shifted touch input sensor to provide localized haptic output to that user.

BACKGROUND

An electronic device can include a vibrating mechanism to communicate with a user by stimulating the user's sense of touch. The electronic device can activate the vibrating mechanism to solicit the user's attention, enhance the user's interaction experience with the electronic device, or for any other suitable notification or user experience purpose.

However, conventional electronic devices incorporating conventional vibrating mechanisms are only capable to provide output to a user in the form of non-localized vibrations; such devices are not capable to stimulate a user's sense of touch in any other manner.

SUMMARY

Embodiments described herein generally relate to electronic devices that include an interface to receive input from a user and to provide haptic output to the same user. Such an interface is referred to herein as an "input/output interface." The input/output interface can be positioned below a surface referred to herein as an "interface surface." An example interface surface is a protective outer layer of the electronic device, such as a cover glass positioned over a display.

The input/output interface typically includes at least one input sensor, such as a touch input sensor or a force input sensor. In addition, the input/output interface includes at least one haptic output element. For example, the haptic output element can be configured to increase or decrease an amount of perceived friction between the interface surface and the user's finger as it moves across the interface surface. In other examples, the haptic output element is configured to generate vibrations of specific regions of the interface surface to provide mechanical haptic feedback (e.g., click, pop, shift, and so on) to the user.

In many cases, a haptic output element operates at high voltage relative to other systems or components of the electronic device. In these embodiments, certain components or subsystems of the electronic device and/or the input/output interface can be ground-shifted such that a local circuit ground and a local circuit voltage source each follow a modulated high voltage—while maintaining a substantially constant direct current bias between them—that, in turn, is used to drive the high-voltage portions of the input/output interface.

For example, in one embodiment, sensing lines of a capacitive touch sensor can be disposed below a conductive sheet having high resistivity. In this arrangement, the sensing lines can be ground-shifted to 600.0 Vpp, capacitively coupling to the conductive sheet, and driving the sheet to a high voltage that may, in turn, capacitively couple to the user's finger through the interface surface. As a result of this construction, the user may perceive a localized increase in friction between the interface surface and the user's finger. In this manner, the capacitive touch sensor can be configured to provide haptic output (e.g., friction modulation) and to receive touch input.

BRIEF DESCRIPTION OF THE FIGURES

Reference will now be made to representative embodiments illustrated in the accompanying figures. It should be understood that the following descriptions are not intended to limit the disclosure to a finite set of preferred embodiments. To the contrary, it is intended that the following description covers alternatives, modifications, and equivalents as may be included within the scope of the described or depicted embodiments and as defined by the appended claims.

The use of the same or similar reference numerals in different figures indicates similar, related, or identical items.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference an electronic device that includes an input/output interface to receive input from a user and, additionally, to provide haptic output to that user. As noted above, the phrase "input/output interface," as used herein, generally references a system or set of components configured to (1) receive input from a user at a surface and (2) to provide haptic output (e.g., vibrations, in-plane displacements, out-of-plane displacements, friction modulation, and so on) to the same user through the same surface. The surface associated with an input/output interface is referred to herein as an "interface surface."

An input/output interface typically includes at least one input sensor, such as a touch input sensor or a force input sensor, and at least one haptic output element. Example touch input sensors include, but are not limited to: capacitive touch sensors (e.g., multi-touch, single touch, mutual capacitance, self-capacitance, and so on); resistive touch sensors; ultrasonic touch sensors; optical/image-based touch sensors; radio frequency touch sensors; acoustic, optical, or electromagnetic interferometric touch sensors; and so on, or any combination thereof. Example force input sensors include, but are not limited to: piezoelectric force sensors; capacitive force sensors; ultrasonic force sensors; resistive force sensors; and so on, or any combination thereof. Example haptic output elements include, but are not limited to: piezoelectric bodies; vibrating elements; electrostatic sheets; thermal elements; and so on, or any combination thereof.

In some cases, a single component or subsystem of an input/output interface can be configured to detect input and, additionally, to provide haptic output. For example, a piezoelectric body that can be used as a haptic output element can also serve as a dielectric layer separating sensing electrodes of a capacitive touch sensor. In another example, a ground electrode of the piezoelectric body can be used as a ground electrode of the capacitive touch sensor. In yet another example, sensing electrodes of the capacitive touch sensor can be used to drive an electrostatic sheet to modulate friction between a user's finger and the interface surface. Accordingly, it is appreciated that in some examples and implementations, various portions and/or components of an input sensor can be shared by a haptic output element. As a result of these constructions, an input/output interface can be manufactured to smaller dimensions, with fewer parts and materials, at increased speed, and reduced cost. It may be appreciated that any embodiment described herein—or any alternative thereto, or modification thereof—can incorporate one or more input sensors that share one or more elements, electrodes, components, or layers with a haptic output element.

Further, in some embodiments, a haptic output element of the input/output interface is configured to receive a voltage that is substantially higher than a system voltage or reference voltage of the electronic device. For example, a haptic output element may be configured to drive an electrostatic sheet (e.g., a conductive plate) positioned below the interface surface with a high voltage signal in order to increase perceived friction between the user's finger and the interface surface via electroadhesion. In another example, a haptic output element may be configured to apply a high voltage signal to a piezoelectric body in order to mechanically agitate the interface surface (in-plane or out-of-plane) nearby the user's finger.

In some cases, these "high-voltage" circuits may be conductively or capacitively coupled to other systems of the electronic device that are not tolerant of high voltage (e.g., "low-voltage" systems or circuits). For instance, an electrostatic sheet configured to operate at high voltage may be conductively or capacitively coupled to a capacitive touch sensor configured to operate at a low voltage. In these embodiments, the low-voltage system is ground-shifted to protect that system from the high-voltage signals generated, received, or otherwise associated with, the high-voltage circuit.

In other words, certain low-voltage systems of the electronic device can be biased to high voltage in a manner that follows the high voltages signal(s) of the haptic output element(s) of the input/output interface. In addition, these systems or circuits can be electrically (and, optionally, physically) isolated from the system ground and system voltage source(s) of the electronic device to prevent unintended capacitive or conductive coupling to system ground. These circuits or systems are referred to herein as "shifted" circuits or "shifted" systems.

A shifted circuit, such as described herein, operates between a local voltage source and a local ground, each isolated (electrically and/or physically) from the system voltage source(s) and the system ground of the electronic device that incorporates the shifted circuit. In these examples, the voltage difference between the local voltage source (the "shifted source") and the local ground (the "shifted ground") is a constant, low-voltage value. As a result, a shifted circuit can be implemented with conventional low-voltage tolerant components.

In one example, an input/output interface is configured to receive touch input and, additionally, to modulate friction between the user's finger and the interface surface. For instance, the input/output interface can be configured to drive an electrostatic sheet with a high voltage signal in order to increase perceived friction between the user's finger and the interface surface. In this example, the input/output interface can drive the electrostatic sheet by capacitively coupling the plate to a shifted capacitive touch sensor positioned below, and typically conductively decoupled from, the electrostatic sheet.

As a result of the capacitive coupling, the user may perceive increased friction due to electroadhesion when the user's finger moves across the interface surface. In other words, the user may perceive certain regions of the interface surface as having different friction than other regions. Certain regions may be perceived to be high friction regions (e.g., above the electrostatic sheet driven to higher voltage, at a higher frequency, or at a higher duty cycle) whereas other regions may be perceived to be low friction regions (e.g., above the electrostatic sheet not driven or driven to a lower voltage, at a lower frequency, or at a lower duty cycle).

In one embodiment of this example, the shifted source and the shifted ground of the capacitive touch sensor can be biased to 600.0 V and 595.0 V, respectively, each measured with respect to system ground. As a result of this operational configuration, the capacitive touch sensor can detect touch input to the electrostatic sheet with shifted low-voltage components operating across a 5.0 V bias, while simultaneously increasing friction by driving the electrostatic sheet to a voltage between 600.0 V and 595.0 V. In other words, as a result of the shifted source and shifted ground, the low-voltage components of the capacitive touch sensor are isolated from system ground. In this manner, the input/output interface is configured to increase friction and detect touch input.

In other cases, an input/output interface can be configured to provide haptic feedback in a different manner. For example, in one embodiment, a shifted capacitive touch sensor of an input/output interface is implemented with a piezoelectric body that separates various row and column electrodes used for touch sensing. In this example, the input/output interface can be configured to apply a high voltage signal across the piezoelectric body to generate a haptic output.

In further embodiments, more than one system or subsystem of the electronic device can be shifted. Accordingly, generally and broadly, it is appreciated that a shifted circuit can be incorporated into, and/or otherwise associated with, any suitable system, subsystem, component, circuit, processor, trace, conductor, housing portion, antenna, display or sensor layer, electromagnetic shield, and so on interior to or exterior to an electronic device. Similarly, a shifted circuit can be shifted to any number of suitable voltages, for any suitable period of time, in any suitable waveform, at any suitable duty cycle or frequency. Such signals include direct current signals, alternating current signals, arbitrary waveform signals, repeating signals, digital signals, analog signals, and so on.

For example, in one embodiment, a shifted source is biased to 400.0 Vpp and a shifted ground—in phase with the shifted source—is biased to 400.0 Vpp, with a direct current bias of negative 3.3 V. In another example, a shifted source is biased according to a step function that increases from 5.0V to 200.0V and a shifted ground is biased according to a step function—in phase with the shifted source—that increases from 0.0V to 195V. In yet another example, a shifted source is biased according to a chirp function characterized by an envelope descending from 100.0V and a shifted ground characterized by the same chirp function having a direct current bias of negative 5.0 V. In yet another example, a shifted source is biased according to an acoustic signal characterized by an envelope having a maximum voltage of 100.0V and a shifted ground is biased according to the same acoustic signal characterized by a negative direct current bias of 5.0V.

For simplicity of description, many embodiments that follow reference an input/output interface that includes, or is operationally associated with, a shifted input sensor having a shifted source following a sinusoidal alternating current signal at 600.0 Vpp and a shifted ground of 600.0 Vpp, in phase with the shifted source, and having a negative direct current bias of 5.0V. The shifted input sensor can be any suitable input sensor including, but not limited to: a capacitive touch input sensor; a capacitive force input sensor; a strain-based force input sensor; a strain-based touch input sensor; and so on. In some cases, more than one shifted input sensor and/or shifted input sensor type can be associated with an input/output interface, such as described herein. Further, in some examples, other systems can be shifted, such as a display system or an audio system.

As noted above, in many implementations, the voltage difference between the shifted source and the shifted ground applied to the shifted input sensor is a constant voltage, such as 5.0V. As such, it is appreciated that any suitable voltage—whether such voltage is associated with direct current, alternating current, or is an arbitrary voltage signal—can be chosen for either the shifted source or the shifted ground, so long as the two are in phase with one another and a voltage difference between them is constant. In some embodiments, the presence or absence of a shifted circuit (and/or the voltages associated with that shifted circuit) can depend upon, without limitation: a particular implementation of an input/output interface; a particular electronic device system that is shifted or that is configured to be shifted in response to a command; a particular electronic device; and so on.

In a further embodiment, the interface surface can include a high-resistivity conductive layer disposed over—but electrically isolated (e.g., conductively decoupled) from—the shifted input sensor. The high-resistivity conductive layer may have a sheet resistance of 500 kΩ/sq, 1 MΩ/sq, 5 MΩ/sq, 10 MΩ/sq, 20 MΩ/sq, and so on. In some cases, a higher sheet resistance may be selected so that the high-resistivity conductive layer does not substantially interfere with the operation of the shifted input sensor below it.

It may be appreciated that the preceding examples are not exhaustive. Accordingly, for simplicity of description, many embodiments that follow reference an input/output interface, including a shifted input sensor having a shifted source of 600.0 Vpp.

These and other embodiments are discussed below with reference to FIGS. 1A-7. However, those skilled in the art will readily appreciate that the detailed description given herein with respect to these figures is for explanatory purposes only and should not be construed as limiting.

Figure 1A:
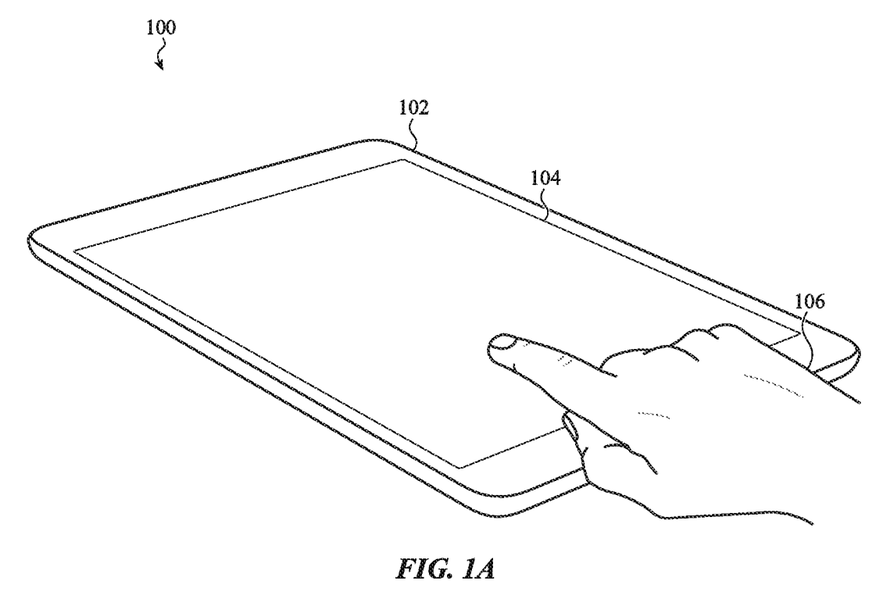
FIG. 1A depicts an electronic device with an input/output interface, such as described herein.
Figure 1B:
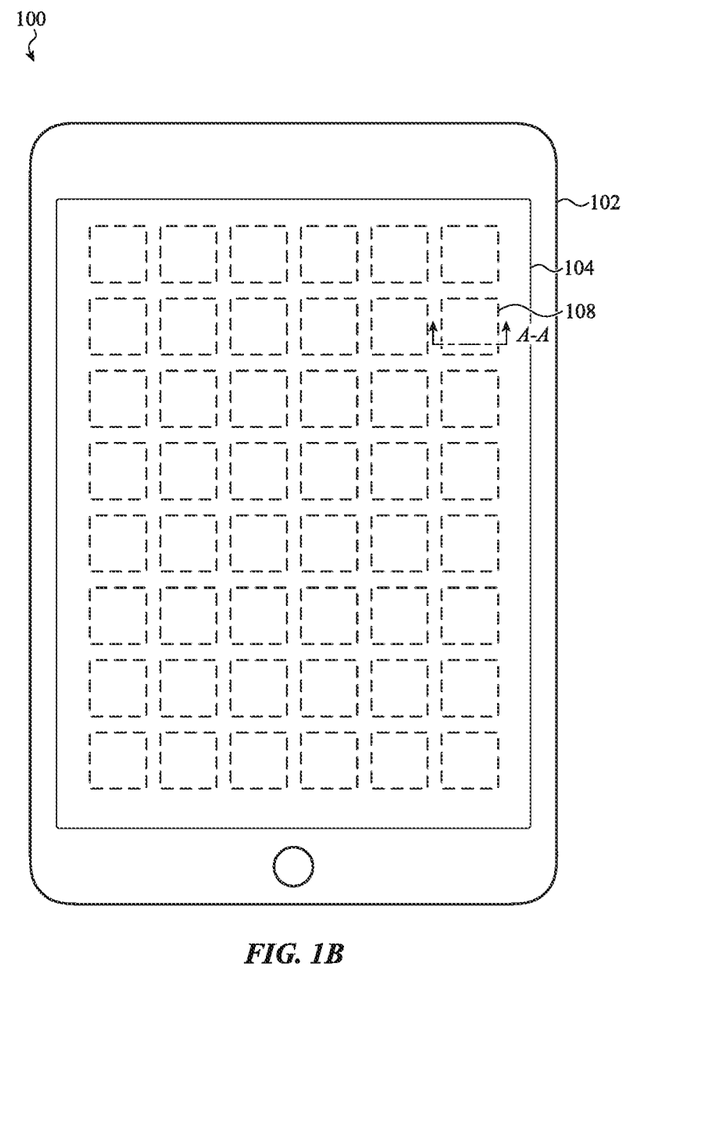
FIG. 1B depicts a plan view of the electronic device of FIG. 1A, depicting addressable regions and/or haptic elements of the input/output interface of the electronic device.

Generally and broadly, FIGS. 1A-1B depict an electronic device 100 that incorporates an input/output interface positioned relative to an interface surface defined by a housing 102 that encloses a display 104 positioned behind the interface surface. The input/output interface can be operated in an input mode (to receive touch and/or force input), an output mode (to provide haptic output), or a multifunction mode. In the multifunction mode, the input/output interface operates in both an input mode and an output mode simultaneously, or rapidly switches between an input mode and an output mode (e.g., time multiplexing).

In the illustrated embodiment, the electronic device 100 is depicted as a tablet computer, although this may not be required of all embodiments and the electronic device can take other forms such as, but not limited to: cellular phones; multi-screen tablet computers; desktop computers; wearable electronic devices; peripheral input devices; console control systems; industrial control devices; medical devices; diagnostic devices; vehicle or aeronautical control or entertainment systems; and so on.

In the illustrated embodiment, the input/output interface is disposed relative to the display 104. In an input mode or a multifunction mode, the input/output interface is configured to receive and/or quantify one or more touch and/or force inputs to the interface surface from a user 106. More particularly, the input/output interface includes at least one input sensor, such as a touch input sensor and/or a force input sensor, to capture user input.

The input sensor(s) are typically configured to detect various combinations of user touch and force input on the surface of the display 104. More particularly, the input sensor(s) can be configured to detect the location of a touch, a magnitude and/or direction of a force exerted, and/or a movement of a touch or a force input on the interface surface above the display 104. In some examples, the input sensor(s) can be configured to detect more than one touch input and/or more than one force input simultaneously. Additionally, the input sensor(s) can be used separately or in combination to interpret a broad range of user inputs such as, but not limited to, touch-based gestures, force-based gestures, touch patterns, tap pattern, single-finger gestures, multi-finger gestures, multi-force gestures, and so on.

The input sensor(s) can be implemented in any number of suitable ways with any suitable technology or combination of technologies including, but not limited to, self-capacitance touch-sensing, mutual capacitance touch-sensing, resistive touch-sensing, optical touch-sensing, acoustic touch-sensing, capacitive force sensing, strain-based force sensing, optical force sensing, acoustic force sensing, and so on, or any combination thereof.

Some embodiments include multiple input sensors. The input sensors can be independently addressable and may be distributed and/or segmented across the display 104. In other embodiments, the input sensors may be disposed relative to a perimeter of the display 104. In such embodiments, the input sensors may be disposed below an opaque or translucent bezel surrounding the display 104. The bezel can take any suitable shape and is not limited to a single color, location, translucency, or transparency. In some cases, the bezel can wrap around one or more sidewalls or edges of the housing 102. In some cases, the bezel can selectively obscure a secondary display, a biometric sensor, an imaging sensor, an input sensor, a button, and so on.

As noted above, in many embodiments, the input sensors are shifted and operated in conjunction with a haptic output element, such as a piezoelectric body or an electrostatic sheet (each of which may be segmented or, alternatively, may extend across the entirety of the interface surface), positioned below the interface surface. The haptic output element can be disposed relative to the display 104 in any suitable manner, including, but not limited to: below the display; above the display; adjacent to the display; along a perimeter of the display; and so on or any combination thereof.

As a result of this construction, the electronic device 100 can provide haptic output to the user 106, via the input/output interface, when the user touches and/or applies a purposeful force to the interface surface. Haptic outputs provided by the input/output interface can include friction modulation and/or mechanical agitation of the interface surface. The haptic output may be localized to a particular region of the interface surface, or may be provided across the entire interface surface.

In some cases, more than one haptic output may be provided at the same time. If the user 106 touches a first location of the interface surface above the display 104, the user may perceive a first haptic output (e.g., mechanical agitation of the interface surface, increased or decreased friction, and so on). If the user 106 touches a second location of the display 104, the user may perceive a second haptic output. If the user drags a finger from the first location to the second location, the user may perceive a transition, which may be abrupt or gradual, between the first haptic output and the second haptic output. In further embodiments, a boundary or border between the first location and the second location may be associated with yet a third haptic output.

More broadly, it may be appreciated that the manner by which the input/output interface operates with the display 104 and/or the electronic device 100 may depend, to an extent, on the technology selected to implement the display 104. For example, an input/output interface may be disposed below a display 104 that is implemented with organic light emitting diodes. In another example, an input/output interface may be disposed above a backlight of a display 104 that is implemented with liquid crystal technology. These examples are merely illustrations of possible configurations of a display and an input/output interface; an input/output interface such as described herein may be implemented and/or integrated with any chosen display technology in any suitable manner. Example display technologies include, but are not limited to, liquid crystal display technology, light-emitting diode technology, organic light-emitting display technology, organic electroluminescence technology, light field display technology, or another type of display technology or combination of technologies.

One example configuration of a display and an input/output interface is illustrated in FIG. 1B, which depicts a plan view of the electronic device 100 shown in FIG. 1A. The input/output interface includes a set of haptic output elements, drawn in phantom, and configured to provide localized haptic output to the user 106. In particular, forty-eight individually-addressable haptic elements are shown, one of which is identified as the haptic element 108. For simplicity of description, the embodiments that follow reference the haptic element 108, but it is appreciated that the other independently-addressable haptic elements of the input/output interface depicted in FIG. 1B may be similarly or identically configured. In other embodiments, however, a single haptic element may be required.

The haptic element 108 can include one or more electrodes that, when driven with a voltage, generate a haptic output. As with other embodiments described herein, the haptic output can be, as an example, an increase or decrease in perceived friction or a mechanical agitation (e.g., vibration, shift, translation, and so on) of the interface surface.

The electrodes can be, without limitation: electrical traces or regions; conductive layers; row or column electrodes of an addressable sensor system (e.g., touch sensor system, force sensor system, and so on); strain sensors; capacitive gap sensors; electrodes; and so on. The e may have high resistance or low resistance and may be transparent or opaque.

The foregoing description of the embodiment depicted in FIGS. 1A-1B, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of an input/output interface are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the various components of the input/output interface depicted in FIGS. 1A-1B can be implemented in a number of suitable and implementation-specific ways.

Figure 2:
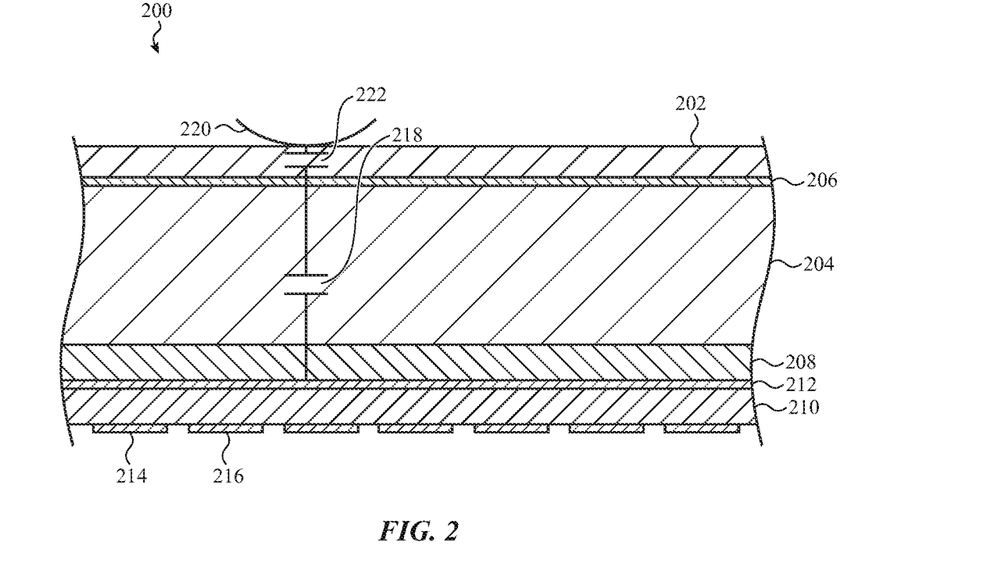
FIG. 2 depicts a simplified cross-section of an addressable haptic element of the input/output interface of FIG. 1B, taken through section A-A.
Figure 3A:
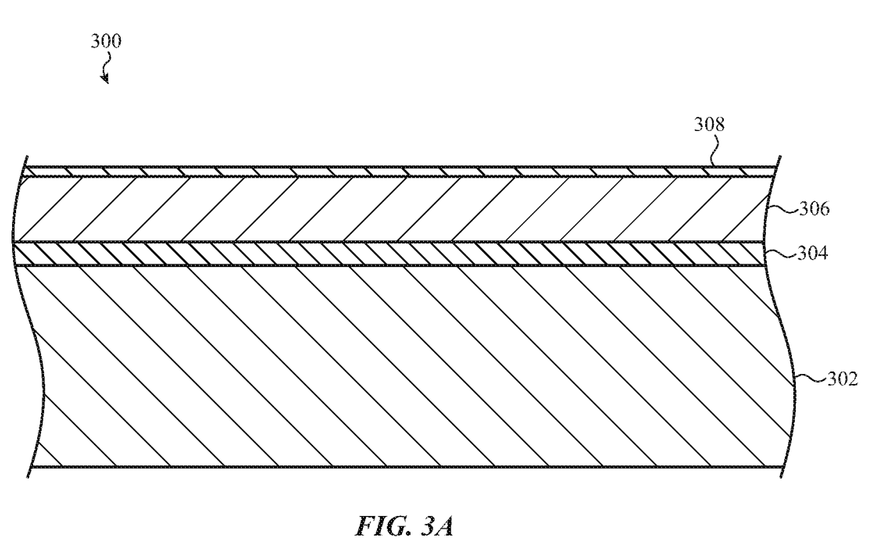
FIG. 3A depicts a cross-section of an addressable haptic element of an input/output interface, such as described herein, particularly illustrating an electrostatic sheet capacitively coupled to a touch input sensor of the input/output interface.
Figure 3B:
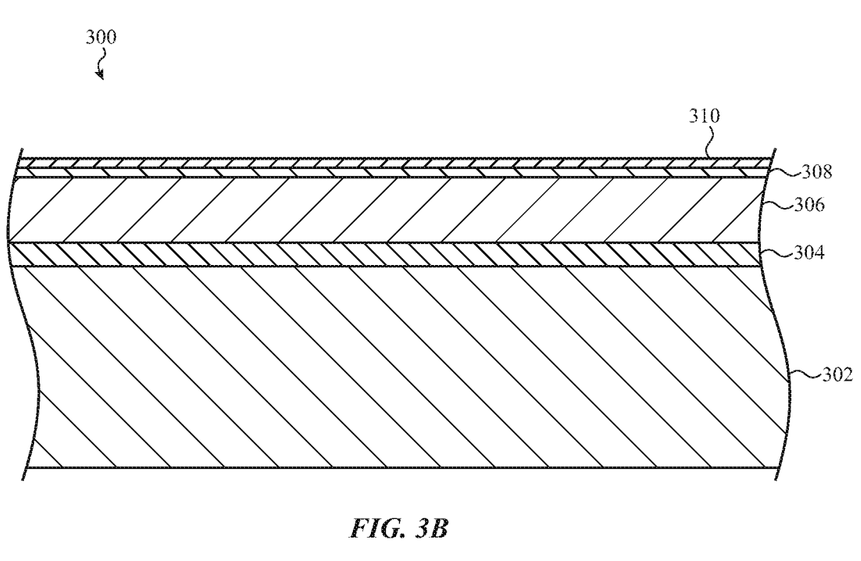
FIG. 3B depicts the addressable haptic element of FIG. 3A, depicted with a protective dielectric coating encapsulating the electrostatic sheet.

Generally and broadly, FIGS. 2-3B depict cross-sections of example portions of input/output interfaces, such as described herein. The input/output interface(s) depicted can be operated in an input mode, an output mode, or a multi-function mode. Typically, the input/output interfaces are associated with at least one shifted circuit, such as described above.

FIG. 2 depicts a simplified cross-section of an addressable haptic element of the input/output interface of FIG. 1B, taken through section A-A. More specifically, the input/output interface 200 is formed from a stack of layers, each of which may be formed from one or more materials and may be conductive, dielectric, or semi-conductive.

The input/output interface 200 is encapsulated and/or protected by an outer layer 202. The outer layer 202 can serve to protect the input/output interface 200 from environmental damage. In typical examples, the outer layer 202 is formed from a dielectric material. In some cases, one or more materials of the outer layer 202 is selected for hardness, whereas in other cases, one or more materials of the outer layer 202 is selected for optical transparency. In still further embodiments, the outer layer 202 is formed from a flexible material. Example materials that may be suitable for the outer layer 202 include, but are not limited to: plastic; glass; cured adhesive; acrylic; sapphire; and so on. In typical embodiments, the outer layer 202 is transparent, although this may not be required. The outer layer 202 is typically thin, and may be disposed to a substantially uniform thickness of 5-10 nm. In other cases, other thicknesses can be used.

The outer layer 202 of the input/output interface 200 is disposed over a structural substrate 204. The structural substrate 204 provides mechanical and/or structural support to the housing 102 depicted in FIG. 1B. As with the outer layer 202, the structural substrate 204 can serve to protect the input/output interface 200 from environmental or impact damage. In typical examples, the structural substrate 204 is formed from a dielectric material. In some cases, one or more materials of the structural substrate 204 is selected for hardness, whereas in other cases, one or more materials of the structural substrate 204 is selected for optical transparency. In still further embodiments, the structural substrate 204 is formed from a flexible material configured to locally deflect in response to a user input force. Example materials that may be suitable for the structural substrate 204 include, but are not limited to: plastic; glass; cured adhesive; acrylic; sapphire; and so on. In typical embodiments, the structural substrate 204 is transparent, although this may not be required. The structural substrate 204 is typically thin, but substantially thicker than the outer layer, and may be disposed to a substantially uniform thickness of 400-1000 μm. In other cases, other thicknesses can be used.

The input/output interface 200 also includes a high-resistivity layer 206 disposed between the outer layer 202 and the structural substrate 204. The high-resistivity layer 206 can be formed from a transparent conductive oxide using a suitable technique (e.g., vapor deposition, printing, gravure, roll-to-roll deposition, and so on) such as, but not limited to: indium, gallium, and zinc alloy oxides; zinc-doped tin oxide; indium-tin alloy oxides; and so on, or any combination thereof. It may be appreciated that other materials, material combinations, dope materials, single-layer materials, multi-layer materials, materials with variable resistivity (e.g., in cross section), may be selected for the high-resistivity layer 206. In many cases, the high-resistivity layer 206 has a sheet resistance of 500 kΩ/sq, MΩ/sq, 5 MΩ/sq, 10 MΩ/sq, 20 MΩ/sq, and so on. In some cases, a higher sheet resistance may be selected so that the high-resistivity conductive layer does not substantially interfere with the operation of sensors positioned below it, such as capacitive touch sensors. As with other layers of the input/output interface, the high-resistivity layer 206 is typically thin, and may be disposed to a substantially uniform thickness of 0.5 to 2 μm. In other cases, other thicknesses can be used.

The input/output interface 200 also includes an optically-clear adhesive layer 208 that couples the structural substrate 204 to an input sensor. The input sensor includes a dielectric substrate 210 that separates a first set of electrodes oriented in a first direction (one of which is visible, and identified as the electrode 212) and disposed on a first surface of the dielectric substrate 210 from a second set of electrodes oriented in a second direction (two of which are identified as the electrodes 214,216) and disposed on a second surface of the dielectric substrate 210.

In some embodiments, the input sensor is a touch input sensor configured to measure for changes in capacitance between the first set of electrodes and the second set of electrodes that may result from the proximity of a user's finger (or another input object, such as a stylus) to the outer layer 202. More generally, the input sensor can operate as a single-touch or multi-touch input sensor.

In other embodiments, the input sensor is a force input sensor configured to measure for changes in capacitance between the first set of electrodes and the second set of electrodes that may result from compression of the dielectric substrate 210. For example, the dielectric substrate 210 can be formed from an elastic material or may include a compressible air gap.

In still further examples, the input sensor may be a combined sensor in which the first set of electrodes are configured to detect touch input via projected capacitance and the second set of electrodes are configured to detect force input via strain-based resistance, inductance, charge, or capacitances measurements. In this manner, changes in an electrical property of the first set of electrodes and/or the second set of electrodes can be correlated to a magnitude of force applied by a user to the outer layer 202.

In still further examples, the dielectric substrate 210 may include a piezoelectric body configured to develop a charge between the first set of electrodes and the second set of electrodes in response to compression. In this manner, changes in voltage between the first set of electrodes and the second set of electrodes can correspond to a magnitude of force applied by a user to the outer layer 202.

It may be appreciated that the preceding examples are not exhaustive and any number of suitable configurations can be implemented. Further, it may be appreciated that certain configurations of the input/output interface 200 may be optionally enabled and/or disabled. More specifically, in some embodiments, the input/output interface 200 may use the first set of electrodes for a first purpose (e.g., touch detection) at a first time, whereas at a second time, the first set of electrodes can be used for a second purpose (e.g. force detection, haptic output).

Accordingly, for simplicity of description, the embodiments that follow refer to the input sensor of the depicted embodiment as a touch input sensor having row electrodes (e.g., the first set of electrodes) and column electrodes (e.g., the second set of electrodes).

As with other embodiments described herein, the input/output interface 200 is also configured to provide haptic output. More specifically, the input/output interface 200 is configured to modulate friction between a user 220 and the outer layer 202. As noted with respect to other embodiments described herein, friction between the user 220 and the outer layer 202 can be modulated (e.g., increased or decreased perceivably) by driving the high-resistivity layer 206 to a high voltage.

The high-resistivity layer 206 can be driven to high voltage in number of ways. For example, in one embodiment, the high-resistivity layer 206 is conductively coupled to the output of a high-voltage generator within the electronic device (e.g., boost converter).

In other examples, however, the high-resistivity layer 206 can be conductively decoupled from any circuit of the input/output interface 200 or the electronic device incorporating it (e.g., the electronic device 100 depicted in FIG. 1B). For example, in the illustrated embodiment, the high-resistivity layer 206 can be capacitively driven by shifting the touch input sensor—such as described above—to an alternating current at high voltage. In this manner, the touch input sensor capacitively couples (e.g., represented by the capacitance 218) to the high-resistivity layer 206, driving the high-resistivity layer 206 to a high voltage with respect to system ground. In turn, the high-resistivity layer 206 capacitively couples to the user 220 (e.g., represented by the capacitance 222), generating the haptic output.

As noted above, one or more characteristics of the high-voltage signal—such as amplitude, frequency, phase, duty cycle, waveform, and so on—used to shift the touch input sensor can affect the haptic output provided by the high-resistivity layer 206 to the user 220. Similarly, the resistivity of the high-resistivity layer 206 can affect the haptic output. In some cases, one or more characteristics of the high-voltage signal are selected based on the resistivity of the high-resistivity layer 206. For example, if the material(s) selected for the high-resistivity layer 206 cooperate to define a relatively high resistivity (e.g., 10 MΩ/sq), the high-voltage signal may be driven at a lower frequency (e.g., 100 Hz-500 Hz). It may be appreciated that—as noted above—any suitable waveform may be applied to a shifted circuit, such as the touch input sensor, to generate any suitable haptic output or haptic effect.

In other embodiments, an input/output interface can be configured in a different manner. For example, FIG. 3A depicts an input/output interface 300. In this embodiment, the input/output interface 300 is positioned above, and coupled to, a display 302. As with other embodiments described herein, the display 302 can be any suitable display.

The input/output interface 300 includes a shifted touch layer 304 positioned above, and coupled to, the display 302. In this manner, the input/output interface 300 and the display 302 are bonded together into a single stack, simplifying manufacturing of an electronic device incorporating the input/output interface 300 and the display 302.

As noted above with respect to FIG. 2, the shifted touch layer 304 can include one or more layers, each including one or more electrodes. The shifted touch layer 304 can be configured as a single-touch or multi-touch touch sensor, or may be configured as a force input layer.

As with other embodiments described herein, the shifted touch layer 304 can be protected by a cover 306. The cover 306 is typically formed from glass or sapphire, or another optically transparent material suitable for protecting the display and/or the shifted touch layer 304.

In this example, a high-resistivity coating 308 is disposed directly over the cover 306. In contrast to the embodiment depicted in FIG. 2, the high-resistivity coating 308 in this embodiment may (optionally) not be protected by an outer layer. As such, one or more materials of the high-resistivity coating 308 may be selected for scratch and/or wear resistance. In another embodiment, such as shown in FIG. 3B, an outer layer 310 can be disposed over the high-resistivity coating 308.

The foregoing description of the embodiment depicted in FIGS. 2-3B, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of an input/output interface are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that in certain implementations, an input/output interface may be operated in conjunction with a non-display input portion of an electronic device, such as a keyboard or trackpad. In these embodiments, an input/output interface such as described herein may be opaque or translucent; optical transparency may not be required.

Accordingly, generally and broadly, it is appreciated that an input/output interface such as described herein can be suitably configured to receive input from a user—whether such input is force input or touch input or a combination thereof—and to provide haptic output to that user. In some examples, more than one haptic outputs can be provided.

Figure 4A:
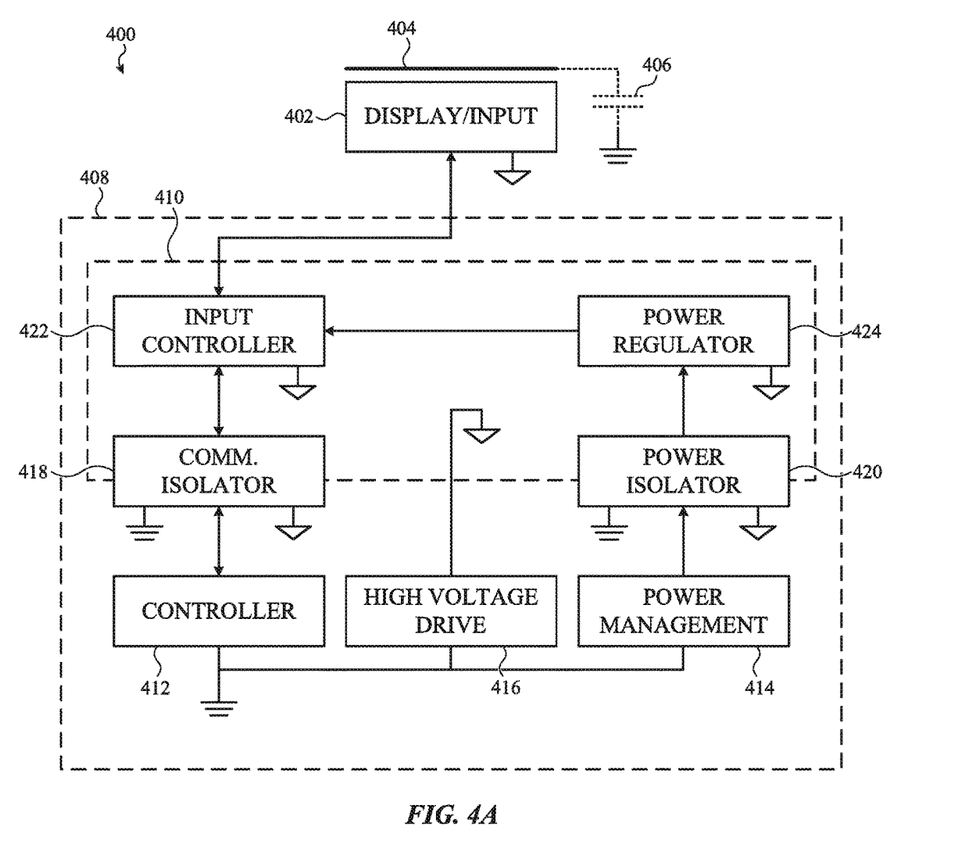
FIG. 4A depicts a simplified system diagram of an input/output interface including a shifted touch input sensor and display layer.
Figure 4B:
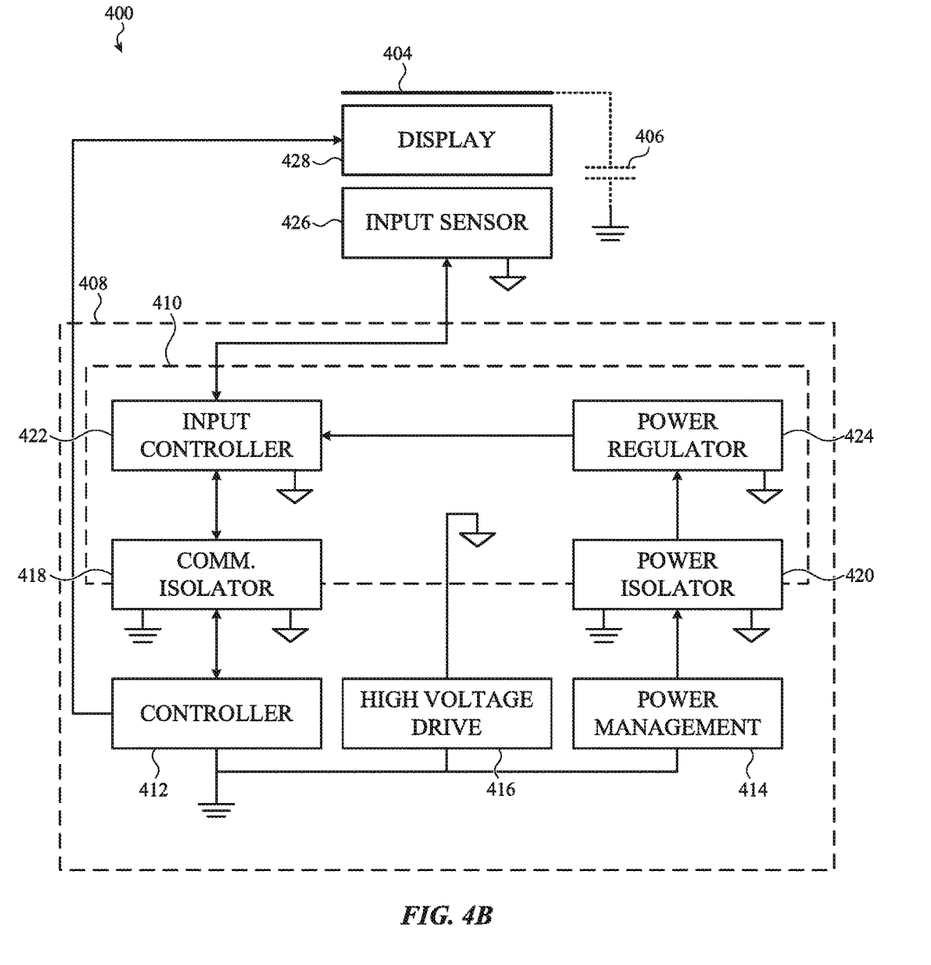
FIG. 4B depicts a simplified system diagram of another input/output interface including a shifted touch input sensor.

Generally and broadly FIGS. 4A-4B depict simplified system diagrams of an electronic device that can incorporate an input/output interface such as described herein. In particular, these electronic devices include at least one shifted circuit.

More specifically, FIG. 4A depicts an electronic device 400 incorporating multiple shifted circuits. In particular, in the illustrated embodiment, both a display and an input sensor (collectively identified as the touch-sensitive display 402) positioned relative to the display are shifted. As noted with respect to other embodiments described herein, the touch-sensitive display can be shifted in any suitable manner; a shifted source and a shifted ground can follow any waveform or function, for any duration of time, at any suitable duty cycle. As a result of this operational configuration, a high-resistivity sheet 404 positioned above the touch-sensitive display 402 can be driven to high voltage via capacitive coupling (identified as the capacitive coupling 406) relative to system ground.

The electronic device 400 can be any suitable electronic device, such as the tablet computer depicted in FIG. 1. The electronic device 400 can be functionally divided into a system voltage domain 408 and a shifted voltage domain 410.

The electronic device 400 includes a controller 412 operable in the system voltage domain 408 to facilitate communication between circuits within the system voltage domain 408 and the shifted voltage domain 410. The controller 412 can be implemented as any electronic device capable of processing, receiving, or transmitting data or instructions. For example, the controller 412 can be a microprocessor, a central processing unit, an application-specific integrated circuit, a field-programmable gate array, a digital signal processor, an analog circuit, a digital circuit, or combination of such devices. The controller 412 may include a single-thread or multi-thread processor. The controller 412 may be a single-core or multi-core processor. Accordingly, as described herein, the term "controller" refers to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The controller 412, in many embodiments, can include or can be communicably coupled to circuitry and/or logic components, such as a dedicated processor and a memory (not shown). The circuitry of the controller 412 can perform, coordinate, and/or monitor one or more of the functions or operations associated with the input/output interface of the electronic device 400.

The controller 412 is coupled to a power management controller 414 and a high voltage driver 416. The power management controller 414 can be configured to regulate power output from the high voltage driver 416. More specifically, the power management controller 414 can be configured to cause the high voltage driver 416 to output a high voltage signal (or more than one high voltage signal, such as a shifted source and a shifted ground) that follows a particular waveform.

The electronic device 400 also includes several functional components, circuits, and/or systems within the shifted voltage domain 410. In particular, the electronic device 400 includes a communications isolator 418, a power isolator 420, an input controller 422, and a power regulator 62.

The communications isolator 418 can be configured to physically and conductively isolate the shifted voltage domain 410 from the system voltage domain 408. For example, the communications isolator 418 can include an optocoupler, a capacitive coupling, a transformer, or any other suitable galvanic isolation.

Similarly, the power isolator 420 can be configured to physically and conductively isolate the shifted voltage domain 410 from the system voltage domain 408. For example, the power isolator 420 can include a transformer, a capacitive coupling, or any other suitable galvanic isolation.

The input controller 422 is communicably and conductively coupled to the touch-sensitive display 402. The input controller 422 is configured to convey one or more display signals, received from the communications isolator 418, to the touch-sensitive display 402. In addition, the input controller 422 is configured to receive one or more input signals from the touch-sensitive display 402 that correspond to user touch and/or force input.

The power regulator 424 is communicably and conductively coupled to the input controller 422 and is configured to maintain a substantially constant direct current bias between the shifted source and the shifted ground of the shifted voltage domain 410. For example, the power regulator 424 can include a low dropout regular, a boost-buck converter, a boost converter, a buck converter, a clipping circuit, or any other suitable voltage regulator circuit or combination of circuits.

In other embodiments, a shifted circuit can be implemented in another manner with a greater number of components, subsystems, or controllers or, alternatively, with fewer components, subsystems, or controllers. For example, in one embodiment depicted in FIG. 4B, the display of the electronic device 400 may be operated within the system voltage domain 408. In this embodiment, an input sensor 426 (which can be a touch sensor, a force sensor, or any other suitable sensor) can be operated within the shifted voltage domain 410.

The foregoing description of the embodiment depicted in FIGS. 4A-4B, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of an input/output interface are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, generally and broadly, it may be appreciated that any number of suitable circuits and/or circuit configurations may be provided with a shifted source and a shifted ground separated by a substantially constant direct current bias. As noted above, the shifted source and the shifted ground can follow, in phase, any waveform including but not limited to: sinusoidal waveforms; acoustic waveforms; square waveforms; triangular waveforms; and so on.

Figure 5:
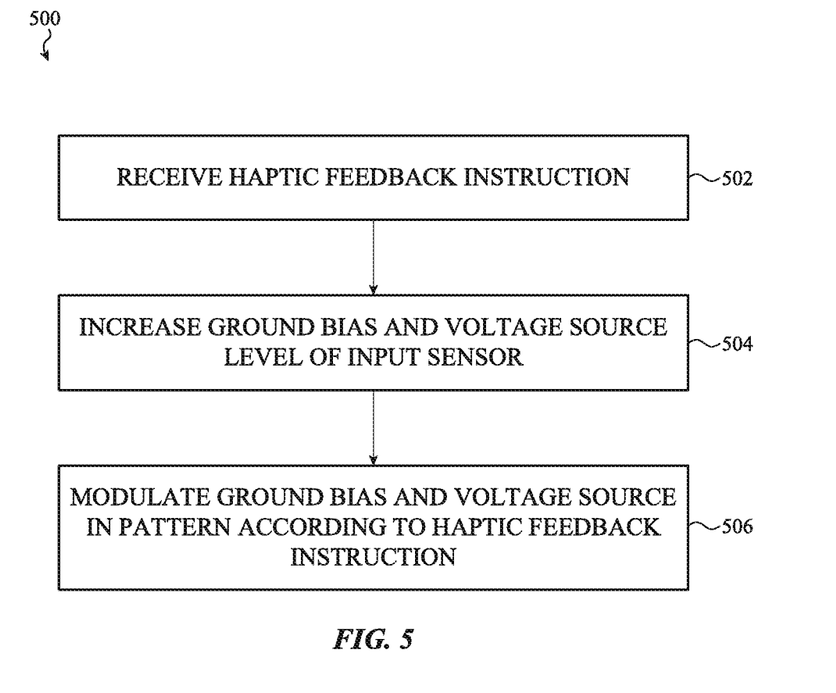
FIG. 5 is a flowchart depicting example operations of a method of providing haptic output by shifting an input sensor of an electronic device.
Figure 6:
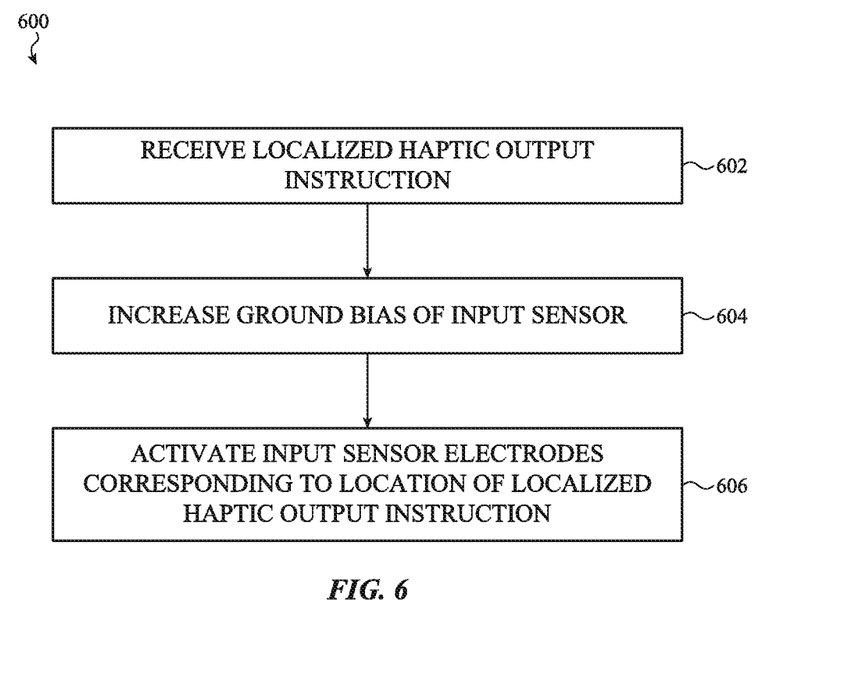
FIG. 6 is a flowchart depicting example operations of a method of providing localized haptic output by shifting an input sensor of an electronic device.
Figure 7:
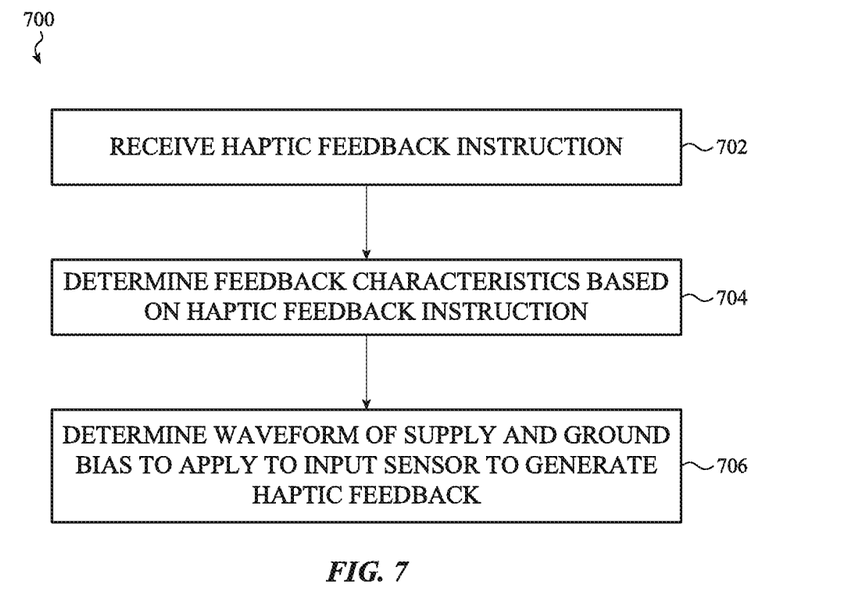
FIG. 7 is a flowchart depicting example operations of a method of shifting an input sensor of an electronic device to generate specific haptic output having specific haptic output characteristics.

Generally and broadly, FIGS. 5-7 are flowcharts depicting methods of operating an input/output interface such as described herein.

FIG. 5 is a flowchart depicting example operations of a method of providing haptic output by shifting an input sensor of an input/output interface of an electronic device. The method 500 can be performed, in whole or in part, by a controller or processor of the input/output interface or the electronic device, such as described above in reference to FIGS. 4A-4B.

The method 500 includes operation 502 in which a haptic feedback instruction is received by the controller. The haptic feedback instruction can include information such as, but not limited to: haptic feedback type information (e.g., mechanical agitation of the interface surface, friction modulation, combinations thereof, and so on); haptic feedback location information (e.g., localized haptic feedback, generalized haptic feedback, and so on); haptic feedback threshold information (e.g., force thresholds, touch location thresholds, and so on); haptic feedback duration information; and so on. In many cases, the haptic feedback information originates from, and/or is associated with, an application of, a graphical user interface of, or operation of the electronic device.

The method 500 also includes operation 504 in which a local ground bias and a local voltage source of the input sensor of the electronic device is increased. In other words, at operation 504, the input sensor is shifted to a high voltage in response to the haptic feedback instruction.

The method 500 also includes operation 506 in which the local ground bias and the local voltage source—the shifted ground and the shifted source—are modulated according to the haptic feedback instruction. For example, if the haptic feedback instruction includes information corresponding to a frequency of haptic feedback to be provided, the shifted source and the shifted ground can be modulated according to that frequency. As noted above, the shifted ground and the shifted source can be modulated according to any waveform, at any frequency, at any duty cycle, and so on.

FIG. 6 is a flowchart depicting example operations of a method of providing localized haptic output by shifting an input sensor of an electronic device. As with the method 500, the method 600 can be performed, in whole or in part, by a controller or processor of the input/output interface or the electronic device, such as described above in reference to FIGS. 4A-4B.

The method 600 includes operation 602 in which a localized haptic feedback instruction is received by the controller. As with the method 500, the haptic feedback instruction received at operation 602 can include information such as, but not limited to: haptic feedback type information (e.g., mechanical agitation of the interface surface, friction modulation, combinations thereof, and so on); haptic feedback threshold information (e.g., force thresholds, touch location thresholds, and so on); haptic feedback duration information; and so on. In many cases, the haptic feedback information originates from, and/or is associated with, an application of, a graphical user interface of, or operation of the electronic device.

The method 600 also includes operation 604 in which the input sensor is shifted. Next, at operation 606, electrodes of the input sensor (e.g., touch sensing electrodes, force sensing electrodes, and so on) corresponding to the location of the localized haptic output are activated or otherwise modulated according to the haptic feedback instruction. In these examples, electrodes and/or other portions not associated with the location of the localized haptic output can be disabled (e.g., the shifted ground a shifted voltage source at the same potential).

FIG. 7 is a flowchart depicting example operations of a method of shifting an input sensor of an electronic device to generate specific haptic output having specific haptic output characteristics. As with the methods 500 and 600, the method 700 can be performed, in whole or in part, by a controller or processor of the input/output interface or the electronic device, such as described above in reference to FIGS. 4A-4B.

As with the methods 500 and 600, the method 700 includes operation 702 in which haptic feedback instruction is received. As noted above, the haptic feedback instruction can include any suitable information. The method 700 also includes operation 704 in which one or more haptic feedback characteristics are determined from the haptic feedback instruction. Example characteristics can include, but are not limited to: duration; magnitude; location; pattern; threshold(s); and so on. Finally, at operation 706 a waveform to apply to the shifted source and shifted ground. As with other embodiments described herein, the waveform may be based, in whole or in part, on the haptic feedback instruction.

The foregoing description of the embodiment depicted in FIGS. 5-7, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of an input/output interface are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, the various types of haptic feedback described above may not be exhaustive. For instance, in some examples, a haptic output can be a localized decrease in perceived friction between the user's finger and the interface surface. To generate the haptic output, the input/output interface drives a piezoelectric body, optionally coupled to a shifted circuit such as the shifted input sensor, below the interface surface at a high frequency (e.g., ultrasonic), thereby causing the interface surface to vibrate. As a result, when the user's finger moves across the interface surface, the user may perceive decreased friction due to decreased contact area or time between the user's finger and the interface surface. In this example, certain regions of the interface surface may be perceived to be higher friction regions (e.g., above a piezoelectric body not driven or driven to a lower voltage, at a lower frequency, or at a lower duty cycle) whereas other regions may be perceived to be lower friction regions (e.g., above a piezoelectric body to a higher voltage, at a higher frequency, or at a higher duty cycle).

In yet another example, the haptic output generated by an input/output interface can be a localized vibration, translation, or other mechanical agitation of the interface surface. To generate the haptic output, the input/output interface drives an electrode of a piezoelectric body—optionally coupled to a shifted circuit—below the interface surface at a low frequency (e.g., 100 Hz to 200 Hz), thereby mechanically agitating the interface surface. The piezoelectric body can be positioned below or above the display. In other cases, the piezoelectric body is positioned adjacent to the display. In this manner, when the user's finger moves across the interface surface, the user may perceive a mechanical agitation of the interface surface such as a click, a pop, a vibration, and so on.

Further, it may be appreciated that the present disclosure recognizes that personal information data, including personal user settings and haptic feedback preferences, in the present technology, can be used to the benefit of users. For example, the use of haptic feedback on a surface of an electronic device can be used to provide for a more immersive computing experience.

The present disclosure further contemplates that the entities responsible for the collection, analysis, disclosure, transfer, storage, or other use of such personal information or communication data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including personal settings or preferences. That is, the present disclosure contemplates that hardware and/or software elements can be provided to prevent or block access to such personal information data.

In addition, one may appreciate that although many embodiments are disclosed above, that the operations and steps presented with respect to methods and techniques described herein are meant as exemplary and accordingly are not exhaustive. One may further appreciate that alternate step order or, fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
   an interface surface configured to receive a user input;
   an input sensor positioned below the interface surface;
   a haptic output element capacitively coupled to the input sensor and positioned above the input sensor and below the interface surface; and
   a controller configured to ground-shift the input sensor to drive the haptic output element.

2. The electronic device of claim 1, wherein the input sensor is a capacitive touch input sensor.

3. The electronic device of claim 2, wherein the capacitive touch input sensor comprises a piezoelectric body.

4. The electronic device of claim 3, wherein the piezoelectric body separates a first set of electrodes from a second set of electrodes.

5. The electronic device of claim 3, wherein the controller is configured to apply a high voltage signal to the piezoelectric body to generate a localized haptic output through the interface surface.

6. The electronic device of claim 1, wherein the haptic output element comprises a high-resistivity sheet.

7. The electronic device of claim 6, further comprising:
   a cover positioned over the input sensor; wherein
   the high-resistivity sheet is disposed on the cover.

8. The electronic device of claim 6, further comprising an outer layer disposed over the high-resistivity sheet.

9. The electronic device of claim 1, wherein shifting the input sensor comprises:
   providing a shifted ground to the input sensor; and
   providing a shifted voltage source to the input sensor.

10. The electronic device of claim 9, wherein the shifted ground and the shifted voltage source are separated by a substantially constant direct current bias.

11. The electronic device of claim 9, wherein the shifted ground and the shifted voltage source are configured to follow a waveform corresponding to a haptic feedback instruction received by the controller.

12. An electronic device comprising:
   a system voltage source;
   a system ground;
   a substrate defining an interface surface;
   a touch input sensor positioned below the substrate and conductively decoupled from the system voltage source and the system ground, the touch input sensor comprising:
      a local voltage source; and
      a local ground;
   a conductive layer disposed on the substrate, conductively decoupled from the system voltage source and the system ground, and capacitively coupled to the touch input sensor; and
   a controller configured to modulate the local voltage source and the local ground of the touch input sensor to drive the conductive layer to a high voltage.

13. The electronic device of claim 12, wherein the conductive layer comprises a high-resistivity sheet.

14. The electronic device of claim 12, wherein the substrate, the touch input sensor, and the conductive layer are optically transparent.

15. The electronic device of claim 12, further comprising a display positioned below the touch input sensor.

16. The electronic device of claim 12, wherein driving the conductive layer to a high voltage produces a haptic output through the interface surface.

17. The electronic device of claim 12, wherein the touch input sensor comprises a piezoelectric body.

18. The electronic device of claim 17, wherein the touch input sensor further comprises a first set of electrodes disposed on a first surface of the piezoelectric body and a second set of electrodes disposed on a second surface of the piezoelectric body.

19. A method of providing haptic output with a touch input sensor, the method comprising:
   receiving a haptic feedback instruction;
   increasing a local ground of the touch input sensor based on the haptic feedback instruction; and
   increasing a local voltage source of the touch input sensor based on the haptic feedback instruction.

20. The method of claim 19, further comprising modulating the local ground and the local voltage source based on the haptic feedback instruction.

* * * * *